(12) United States Patent
Liaw et al.

(10) Patent No.: US 7,323,518 B2
(45) Date of Patent: Jan. 29, 2008

(54) NORBORNENE COMPOUNDS WITH CROSS-LINKABLE GROUPS AND THEIR DERIVATIVES

(75) Inventors: Der-Jang Liaw, Taipei (TW); Ching-Chong Huang, Taipei (TW)

(73) Assignee: National Taiwan University of Science & Technology, Taipei (TW)

( * ) Notice: Subject to any disclaimer, the term of this patent is extended or adjusted under 35 U.S.C. 154(b) by 0 days.

(21) Appl. No.: 11/522,483

(22) Filed: Sep. 18, 2006

(65) Prior Publication Data
US 2007/0066774 A1 Mar. 22, 2007

Related U.S. Application Data

(62) Division of application No. 10/777,055, filed on Feb. 13, 2004, now Pat. No. 7,132,565.

(51) Int. Cl.
*C08G 61/08* (2006.01)
(52) U.S. Cl. .................. 525/301; 525/327.3; 525/338; 526/282
(58) Field of Classification Search .............. 525/327.3, 525/301, 338; 526/282
See application file for complete search history.

(56) References Cited

U.S. PATENT DOCUMENTS 3,277,036 A 10/1966 Whitworth, Jr. et al.
3,681,438 A * 8/1972 Starcher et al. ............. 560/220

OTHER PUBLICATIONS

Liaw, et al. Polynorbornene with Cross-Linkable Side Chains via Ring-Opening Metathesis Polymerization, Macromolecules 2000, vol. 33, 6925-6929.

* cited by examiner

*Primary Examiner*—Fred Teskin
(74) *Attorney, Agent, or Firm*—Birch, Stewart, Kolasch & Birch, LLP

(57) ABSTRACT

The present invention provided a norbornene compound with cross-linkable groups and their derivative polymers, wherein said cross-linkable groups were olefin or epoxy groups. Norbornene polymers with cross-linkable side chain and their block copolymers as well as modified derivatives were prepared via living ring-open metathesis polymerization method. The resulting polymers with excellent solubility and optic properties had narrow molecular weight distribution, well-controlled molecular weight, small refraction ration and high transparency. They were also suitable for preparing hybrid materials with high thermal stability and chemical resistance.

3 Claims, 1 Drawing Sheet

NORBORNENE COMPOUNDS WITH CROSS-LINKABLE GROUPS AND THEIR DERIVATIVES

CROSS REFERENCE TO RELATED APPLICATIONS

This application is a divisional of application Ser. No. 10/777,055, filed Feb. 13, 2004, now as U.S. Pat. No. 7,132,565 and all disclosures of the application are incorporated herewith by reference.

BACKGROUND OF THE INVENTION

1. Field of the Invention

The present invention relates to high performance polynorbornene materials and, more particularly, to norbornene monomers with cross-linkable groups and their derivatives 2. Description of the Related Art Polynorbornene and its derivative were the first commercial products produced from ring-opening metathesis polymerization (ROMP) and were important elastomers. Due to the high transparency, improved impact resistance, wide using temperature range and good mechanical and processing properties, polynorbornene and their derivatives were widely applied in shape-memory polymers, lighting devices, machines, electric components, pipe fittings and food packing. In addition, their derivatives, such as polymers containing acid and ester were further used as photo resists.

Metathesis polymerization of olefins was an important process for polymerization, especially the living ring-opening metathesis polymerization with organometallic catalyst. The polymerization process started with ring-opening reaction of cycloalkene in the presence of organometallic catalyst. The reaction continued until cycloalkenyl monomers depleted or the catalysts lost their activities. Advantageously, such polymerization produced less side products during the reaction, and changing the catalyst type or substituted group of the monomers may obtain polymer or co-polymer with different physical properties. Furthermore, their active polymerization characters further facilitated preparation of functional block co-polymers.

Increasing interest in ring-opening metathesis polymerization of norbornene derivatives containing functional groups has developed over recent years with the aim of obtaining polymer structures with attractive properties. Besides of excellent transparency and mechanical properties, cross-linkable polymers have found a wide demand in the domain of interpenetrating polymer networks, non-linear optic materials, and the formation of more thermally and chemically resistant materials.

One of the most widely employed cross-linkable side chains was the methacryloyl group, which polymerizes both thermally and photochemically in the presence of free-radical initiators and photosensitizers, respectively. In prior arts, monomers with poly functional groups easily perform multi-reaction with organic metals to form insoluble gel or cross-linking products. So the use of ring-opening metathesis polymerization (ROMP) in the formation of theses cross-linkable polymers has been limited. 1

It is reported that in the ring-opening metathesis polymerization of 5-methacryloyl-1-cyclooctene, gel formation was observed when Ru catalyst I was used without methyl inhibitors during polymerization.

Therefore, the present invention provided norbornene monomers with cross-linkable olefin group, norbornene monomers with cross-linkable epoxy group, and polymers derived from these two monomers, which may further prepare cross-linked hybrid materials.

BRIEF SUMMARY OF THE INVENTION

The object of the present invention was to provide norbornene monomers with cross-linkable groups. The cross-linkable groups were olefin or epoxy groups which allow the ring opening metathesis polymerization to progress and form norbornene polymer with cross-linkable side chain. The present invention also disclosed a serious of co-polymers and their modified derivatives which had excellent solubility and optic properties. They may be further used for preparing hybrid materials which had high thermal or chemical resistance.

Another object of the present invention was to provide norbornene monomers with cross-linkable groups and their derived polymers which has narrow molecular weight distribution and well-controlled molecular weight and thus to further provide a polymer which has molecular weight distribution (PDI value) below 2 and conformed the requirement of low complex refractive index for optical materials.

Still another object of the present invention was to prepare norbornene compounds with cross-linkable epoxy groups and their polymers and modified derivatives to provide polymer materials with high transparency.

Still another object of the present invention was to polymerize norbornene monomers with cross-linkable olefin/epoxy groups and other norbornene monomers to form functional norbornene block co-polymers.

To achieve said objects, the first aspect of the present invention was to provide a norbornene compound with cross-linkable groups, comprising the structure as formula I:

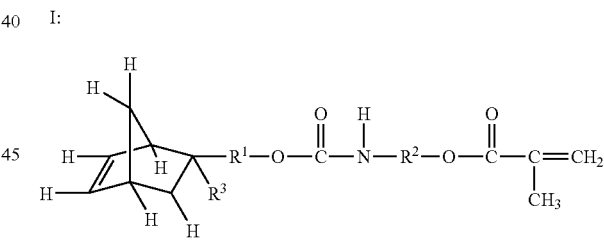

wherein $R^1$ was $-(CH_2)_m-$ or $-C(O)O(CH_2)_n-$, in which $1 \leq m$, $n<4$, and m or n was an integer; $R^2$ was $-(CH_2)_p-$, in which $1<p \leq 4$, and p was an integer; and $R^3$ was H or $CH_3$.

The second aspect of the present invention was to provide a norbornene polymer with cross-linkable side chains, comprising the structure as formula II:

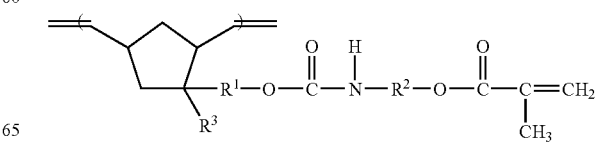

wherein $R^1$ was —$(CH_2)_m$— or —$C(O)O(CH_2)_n$—, in which $1 \leq m, n \leq 4$, and m or n was an integer; $R^2$ was —$(CH_2)_p$—, in which $1—p \leq 4$, and p was an integer; and $R^3$ was H or $CH_3$.

Furthermore, the present invention disclosed a norbornene polymer with cross-linkable side chains, comprising the structure as formula II-2:

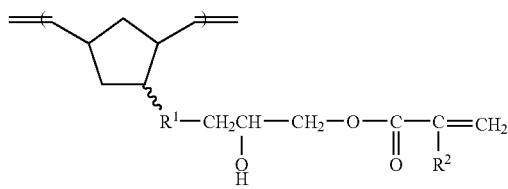

II-2 wherein $R^1$ was —O— or —$(CH_2)_n$—, in which $0—n—4$, and n was an integer; and $R^2$ was H or $CH_3$.

The present invention also disclosed a norbornene polymer with cross-linkable side chains, comprising the structure as formula II-3:

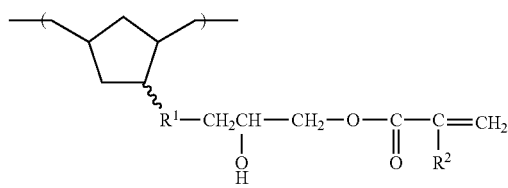

II-3 wherein $R^1$ was —$(CH_2)$—O— or —COO—$(CH_2)j$—, in which $1 \leq j \leq 4$, and j was an integer; and $R^2$ was H or $CH_3$.

The third aspect of the present invention was to provide a block co-polymer with cross-linkable side chains, comprising the structure as formula III:

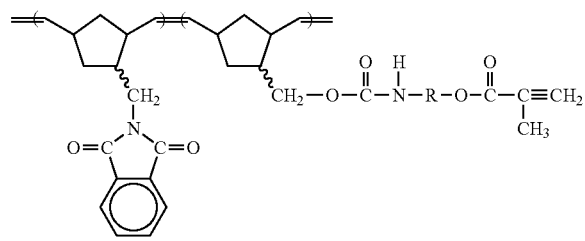

III wherein R was —$(CH_2)_k$—, in which $1 \leq k \leq 4$, and k was an integer.

Another aspect of the present invention was to provide a saturated block co-polymer with cross-linkable side chains, comprising the structure as formula III-2:

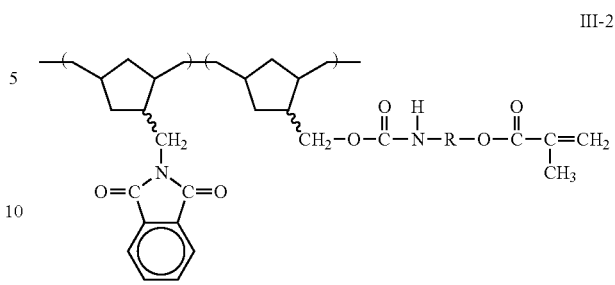

III-2 wherein R was —$(CH_2)_k$—, in which $1 \leq k \leq 4$, and k was an integer.

In addition, the present invention provided a block co-polymer with carbazole group and cross-linkable olefin side chain, comprising the structure as formula III-3:

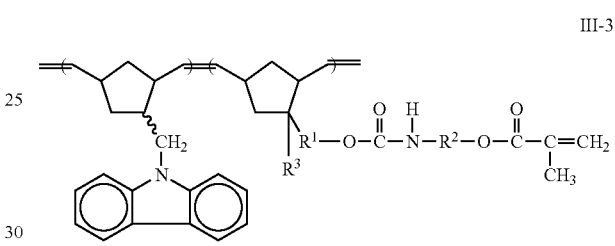

III-3 wherein $R^1$ was —$(CH_2)m$— or —$C(O)O(CH_2)_n$—, in which $1 \leq m, n \leq 4$, and m or n was an integer; $R^2$ was —$(CH_2)p$—, in which $1 \leq p \leq 4$ and p was an integer; and $R^3$ was H or $CH_3$.

Further, the present invention also provided a block co-polymer with amino group and cross-linkable olefin side chain, comprising the structure as formula III-4:

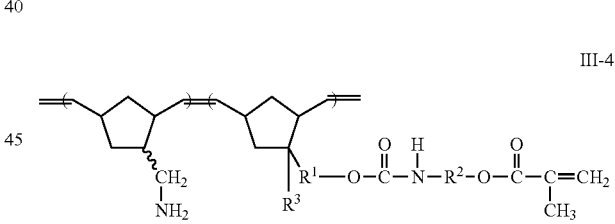

III-4 wherein $R^1$ was —$(CH_2)m$— or —$C(O)O(CH_2)_n$—, in which $1 \leq m, n \leq 4$, and m or n was an integer; $R^2$ was —$(CH_2)p$—, in which $1 \leq p \leq 4$ and p was an integer; and $R^3$ was H or $CH_3$.

The fourth aspect of the present invention was to provide a water-soluble block co-polymer with cross-linkable side chains, comprising the structure as formula IV:

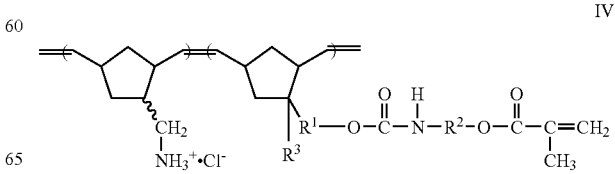

IV wherein $R^1$ was —(CH$_2$)$_m$— or —C(O)O(CH$_2$)$_n$—, in which $1 \leq m$, $n \leq 4$, and m or n was an integer; $R^2$ was —(CH$_2$)$_p$—, in which $1 \leq p \leq 4$ and p was an integer; and $R^3$ was H or CH$_3$.

In addition, the present invention provided another water-soluble block co-polymer with cross-linkable side chains, comprising the structure as formula IV-2:

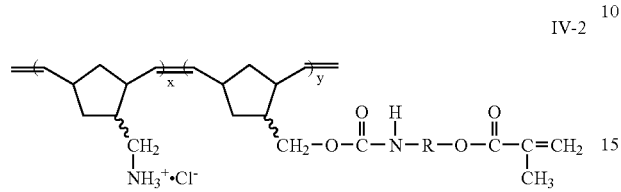

IV-2 wherein R was —(CH$_2$)$_k$—, in which $1 \leq k \leq 4$ and k was an integer.

The fifth aspect of the present invention was to provide a norbornene compound with epoxy groups, comprising the structure as formula V:

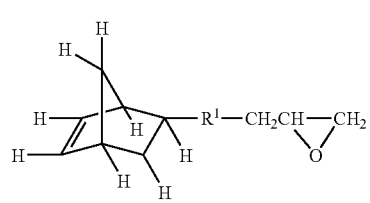

V wherein $R^1$ was —(CH$_2$)—O— or —COO(CH$_2$)$_j$—, in which $1 \leq j \leq 4$ and j was an integer.

The sixth aspect of the present invention was to provide a norbornene polymer with epoxy side chains, comprising the structure as formula VI:

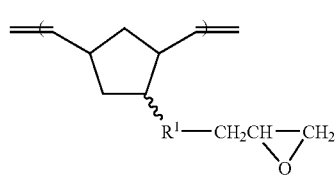

VI wherein $R^1$ was —(CH$_2$)—O— or —COO(CH$_2$)$_j$—, in which $0 \leq j \leq 4$ and j was an integer.

Further, the present invention provided another norbornene compound with epoxy side chains, comprising the structure as formula VI-2:

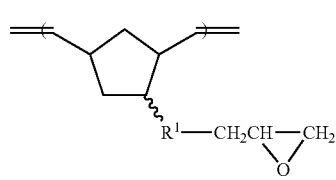

VI-2 wherein $R^1$ was —(CH$_2$)—O— or —COO(CH$_2$)$_j$—, in which $0 \leq j \leq 4$ and j was an integer.

The seventh aspect of the present invention was to provide a norbornene block co-polymer with phthalamide and epoxy groups, comprising the structure as formula VII:

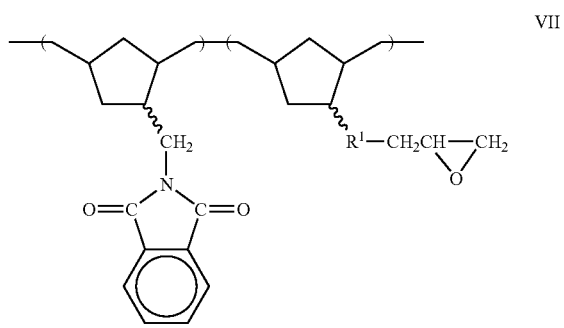

VII wherein $R^1$ was —(CH$_2$)—O— or —COO(CH$_2$)$_j$—, in which $0 \leq j \leq 4$ and j was an integer.

Further, the compound of formula VII was hydrated to form a block co-polymer with cross-linkable epoxy and amino groups, comprising the structure as formula VII-2:

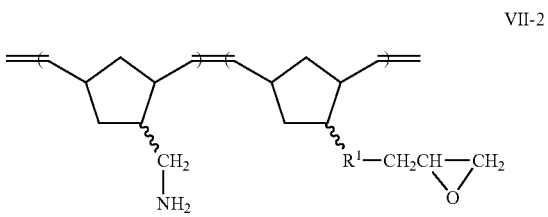

VII-2 wherein $R^1$ was —(CH$_2$)—O— or —COO(CH$_2$)$_j$—, in which $0 \leq j \leq 4$ and j was an integer.

The eighth aspect of the present invention was to provide a norbornene block co-polymer with carbazole and epoxy groups, comprising the structure as formula VIII:

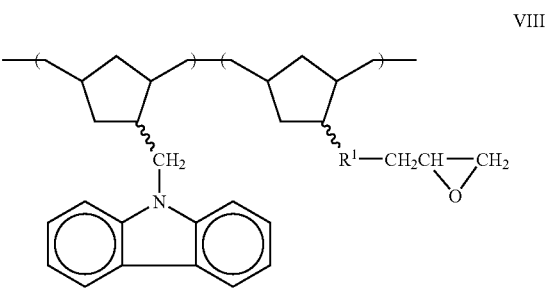

VIII wherein $R^1$ was —(CH$_2$)—O— or —COO(CH$_2$)$_j$—, in which $0 \leq j \leq 4$ and j was an integer.

The ninth aspect of the present invention was to provide a norbornene polymer with quaternary ammonium side chains, comprising the structure as formula VIIII:

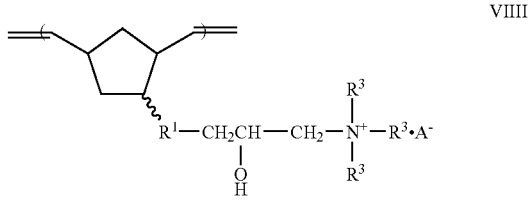

VIIII wherein $R^1$ was —($CH_2$)—O— or —COO($CH_2$)$_j$—, in which $0 \leq j \leq 4$ and j was an integer; $R^3$ was H, $CH_3$ or $C_2H_5$; and $A^-$ was $Cl^-$, $Br^-$ or $CH_3COO^-$.

Further, the present invention also disclosed a norbornene polymer with quaternary ammonium side chains, comprising the structure as formula VIIII-2:

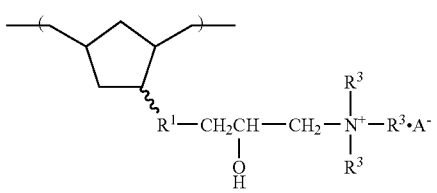

VIIII-2 wherein $R^1$ was —($CH_2$)—O— or —COO($CH_2$)$_j$—, in which $0 \leq j \leq 4$ and j was an integer; $R^3$ was H, $CH_3$ or $C_2H_5$; and $A^-$ was $Cl^-$, $Br^-$ or $CH_3COO^-$.

The present invention also provides a norbornene polymer with olefin side chain, comprising:

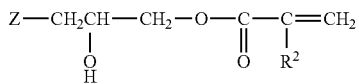

I a compound as formula I, wherein $R^1$ is —O— or —($CH_2$)n—, in which $0 \leq n \leq 4$, and n is an integer; Z is

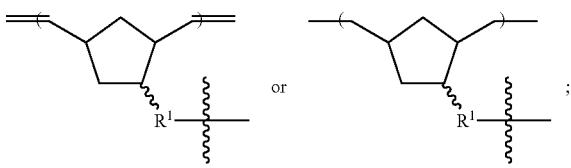

and $R^2$ is H or $CH_3$.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawing which is given by way of illustration only, and thus are not limitative of the present invention, and wherein:

DETAILED DESCRIPTION OF THE INVENTION

Figure 1:
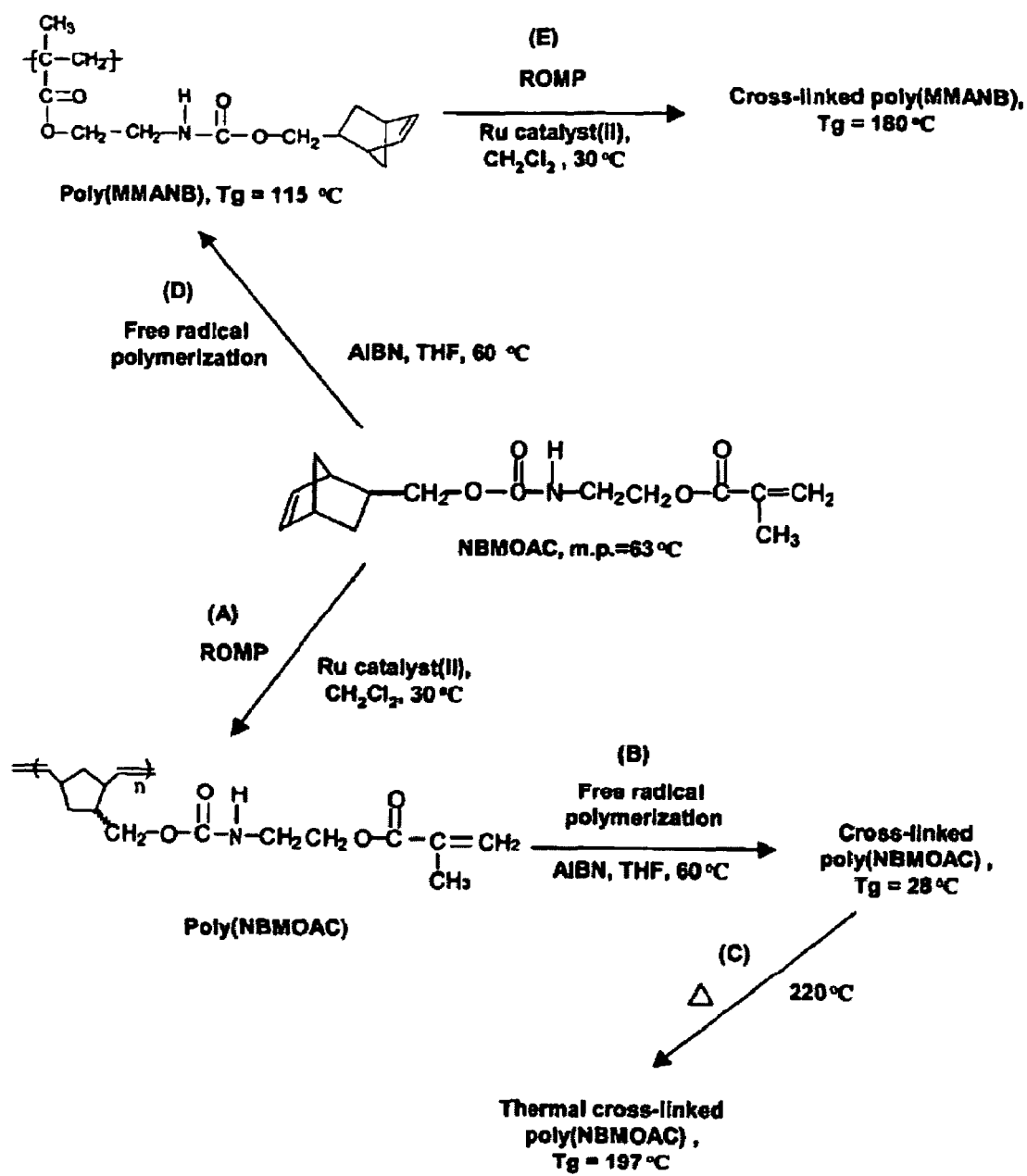
FIG. 1 was a scheme shown the process to prepare various cross-linked hybrid materials from norbornene compound with cross-linkable groups.

The norbornene monomers of the present invention were prepared by Diels-Alder reaction at 180° C. in a high pressure reactor. Diels-Alder reaction was the reaction between diene and alkene for forming a new cycloalkene monomer. The reaction mentioned above was not limited in the high-pressure reactor; all well-known process for Diels-Alder reaction may be used in the present invention. After obtaining norbornene monomers with vinyl side chain or epoxy groups, novel polymers were further prepared by ring-opening metathesis polymerization (ROMP) of said monomers. So various polymers may be prepared by reactions of different olefin groups and radicals.

The reaction conditions for the metathesis polymerization of the present invention include:

Metathesis Catalysts:

These catalysts were tungsten and molybdenum metathesis catalysts, including their halides, oxyhalides or oxides, for example, tungsten hexachloride, tungsten oxychloride, tungsten tetrachloride, molybdenum pentachloride, or molybdenum oxide acetyl acetocarboxylate. Ruthenium metathesis catalysts may also be used in the present invention, preferably $\{Cl_2Ru(CHPh)[P(C_6H_{11})_3]_2\}$ catalyst;

(2) Solvents:

The ring-opening metathesis polymerization of the present invention may be performed without solvents, but the reaction were usually carried out in inert organic solvent.

The organic solvents used here were preferably hydrocarbon solvents, more preferably those cyclohydrocarbon solvents which may completely dissolve ring-opened polymers. For example, aromatic hydrocarbon such as benzene, ethyl benzene, toluene or xylene; aliphatic hydrocarbon such as n-pentane, hexane or heptane; aliphatic cyclohydrocarbon such as cyclopentane, cyclohexane, methyl cyclohexane or dimethyl cyclohexane; halo hydrocarbon such as methylene chloride, ethylene chloride, dichloroethene, tetrachloroethane, chloroform, dichlorobenzene or trichlorobenzene; or the mixture of said solvents. In addition, the ratio of solvent to monomers typically ranges from 1:1 to 20:1, preferably 2:1 to 10:1;

(3) Temperature:

The temperature range for ring-opening metathesis polymerization was not limited, usually −20° C.~100° C., preferably 0° C.~100° C., more preferably 10° C.~80° C.;

(4) Ambiance Atmosphere for Polymerization:

Ring-opening metathesis polymerization was usually carried out under inert gas such as nitrogen or argon gas; beside, it can be also performed under vacuum or oxygen-free environment.

Ring-opened Polymers

The number-average molecular weight (Mn) of the ring-opening metathesis polymers and their co-polymers was 10,000~600,000, and molecular weight distribution (Polydispersity index, PDI=Mw/Mn, i.e., the molecular weight distribution of polymerization) of them was below 2. The ring-opened metathesis polymers were further hydrogenated to form optic polymer materials applied in optic discs, optic lens and transparent film membrane. From prior arts, the complex refraction index dramatically increases if PDI was above 3. The PDI of polymers of the present invention, however, was below 2, which conforms the low complex refractive index requirement of optical materials. The molecular weight and polydispersity were determined by gel permeation chromatography (GPC). Tetrahydrofuran was used as solvent.

In addition to developing novel norbornene monomers, the present invention also provided novel co-polymers formed from novel norbornene monomers and other conventional norbornene monomers. Examples of conventional norbornene monomers include norbornene or norbornene derivatives with alkyl, alkylene or aromatic groups such as 2-norbornene, 5-methyl-2-norbornene, 5,6-dimethyl-2-norbornene, 5-ethyl-2-norbornene, 5-butyl-2-norbornene, 5-vinyl-2-norbornene, 5-phenyl-2-norbornene or dicyclopentadiene, 2,3-dihydrocyclopentadiene and their methyl, ethyl, propyl or butyl substituted compounds.

Besides, conventional norbornene monomers may be substituted by polar groups or some groups containing metals; for example, halogen such as chloro, bromo, flouro atoms; ester moity such as methoxy carboxyl, ethoxy carboxyl or acetyl oxide; cyano; pyridine.

Several examples were used for illustrating the present invention, and the objects, skills and characters will thus be more apparent.

EXAMPLE 1

Synthesis of Norbornene Methanol

Norbornene derivatives were prepared via Diels-Alder reaction in a high-pressure reactor. Dicyclopentadiene was degraded under high temperature to form cyclopentadiene and functional alkene (ex. allyl alcohol). Norbornene methanol were prepared from acryl compounds and cyclopentadiene through Diels-Alder reaction at 180° C. On the other hand, the boiling point of cyclopentadiene was 41° C. while b.p. of allyl alcohol was 97° C., so the reaction must be carried out in a high pressure reactor.

The synthesis procedure was as following:

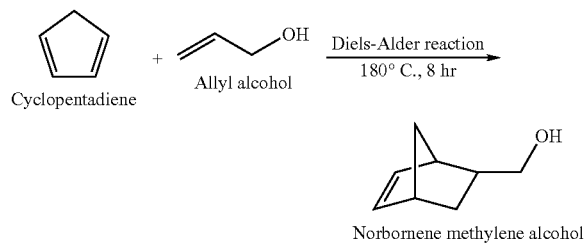

Cyclopentadiene Allyl alcohol Norbornene methylene alcohol Cyclopentadiene (50 g), 1 equiv. of allyl alcohol and 1 g of hydroquinone were put in a high pressure reactor at 180° C. for 8 hr. Un-reacted cyclopentadiene and allyl alcohol were removed under vacuum at room temperature. Resulting solution was further distilled at 92~95° C., 13 mmHg to give norbornene derivatives and their endo- and exo-compounds as following structures, with ratio of 20/80 (exo/endo).

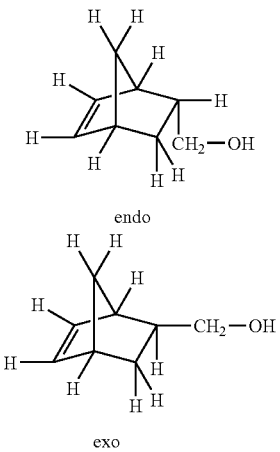

EXAMPLE 2

Synthesis of Norbornene Monomers Containing Olefin Side Chain (NBMOAC)

The procedure for synthesizing norbornene monomers containing olefin side chain was as following scheme:

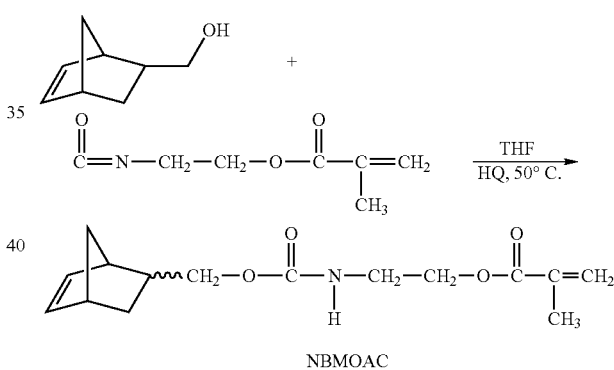

Norbornene methylene alcohol (11.2 g, 0.1 mol) and little hydroquinone were dissolved in 20 ml of tetrahydrofuran in a two-mouth bottle. The mixture of methylacrylethoxy isocyanate (15.0 g, 0.1 mol excess) and tetrahydrofuran (15 ml) were dropwise added into the solution with a funnel at rate of 1 drop/sec. The mixture was heated to reflux with stirring at 50° C. for 6 hr. Small amount of methanol was then added to react with rest methylacrylethoxy isocyanate and the solution became transparent. Solvent was then removed by rotational evaporation to give pale white liquid. A white solid formed from said pale white liquid after a period of time without any disturbance.

After comparison of practical atom analysis and theoretical distribution we found that the theoretical distribution of monomer norbornene containing olefin end ($C_{15}H_{21}O_4N$) was C=64.52%, H=7.52%, N=5.02%; while the practical analysis was C=64.07%, H=7.50%, N=4.98%.

The NMR spectrum of monomer norbornene containing olefin end was as following:

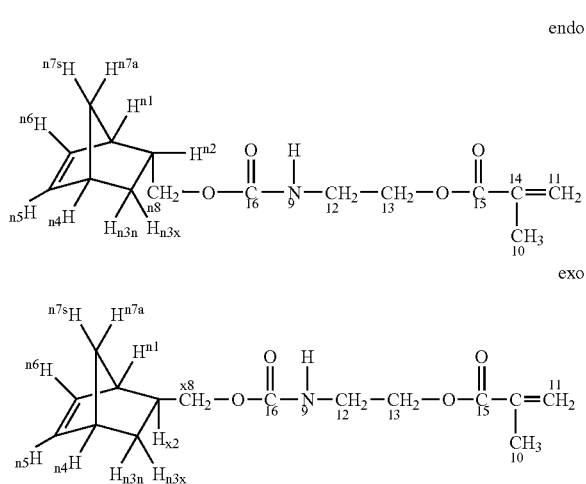

endo exo $^1$H NMR(CDCl$_3$): δ(ppm)=0.44-0.46(H$_{n3n}$), 1.06-1.08 (H$_{x3x}$), 1.14-1.16(H$_{n7a}$), 1.22-1.24(H$_3$), 1.33-1.35(H$_{n7s}$), 1.59(H$_{x2n}$), 1.70-1.74(H$_{n3x}$), 1.83-1.89(H$_{10}$), 2.27(H$_{n2x}$), 2.60(H$_{x4}$), 2.70-2.71(H$_{n4}$, H$_{x1}$), 2.76(H$_{n1}$), 3.39-3.40(H$_{n8}$), 3.51-3.55(H$_{12}$), 3.73-3.77(H$_{13}$), 4.11-4.15(H$_{x8}$), 5.50,5.85 (H$_{11}$,C=C), 5.98(H$_{n6}$), 6.01 (H$_{x6}$,H$_{x5}$), 6.04(H$_{n5}$).

$^{13}$C NMR(CDCl$_3$): δ(ppm)=18.53(C$_{10}$), 29.20(C$_{n3}$), 29.78(C$_{x3}$), 38.46(C$_{x2}$), 39.59(C$_{n2}$), 40.39(C$_{12}$), 41.88(C$_{13}$), 42.50(C$_{x1}$,C$_{n4}$), 43.90,44.16(C$_{x4}$,C$_{n1}$), 45.25(C$_{x7}$), 49.66(C$_{n7}$), 64.01(C$_{n8}$), 68.69(C$_{x8}$), 126.20(C$_{11}$), 132.50 (C$_{n6}$), 136.46-136.51(C$_{x5}$,C$_{x6}$), 137.21(C$_{n5}$) 137.77(C$_{14}$), 157.09(C$_{15}$), 167.57(C$_{16}$).

IR analysis for monomer norbornene with olefin end was as following:
3360($v_{N-H}$), 3050($v_{C-H}$), 2960($v_{C-H}$), 1715($v_{C=O}$), 1640($v_{C=C}$), 1540($v_{C-H}$), 1300($v_{C-O}$).

EXAMPLE 3

Synthesis of Polynorbornene Containing Vinyl Side Chain [poly(NBMOAC)]

The reaction was as following:

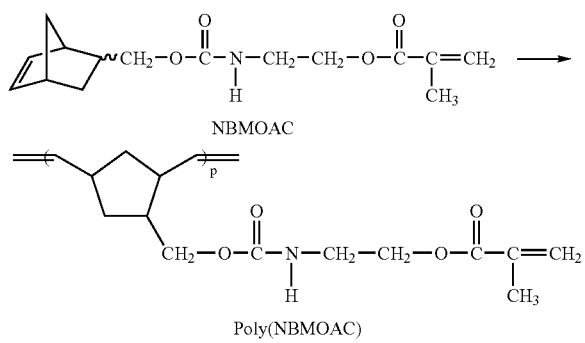

Monomer norbornene containing olefin end (NBMOAC, 0.339 g, 1.215 mmol) was dissolved in 5 ml of methylene chloride and then dehydrated and degassed thrice via freeze-pump-thaw cycle. {RuCl$_2$(CHPh)[P(C$_6$H$_{11}$)$_3$]$_2$} catalyst (0.001 g, 0.001215 mmol) was dissolved in 0.5 ml of methylene chloride and subsequently injected into reactor with a syringe. The solution was stirred at room temperature for 2 hr and then precipitated in methanol to give polymer product whose yield was about 80%.

Characterization 3-1. Characterization of Functional Groups

Monomer norbornene with olefin end (NBMOAC) was successfully synthesized in the present invention, and polynorbornene with vinyl side chain [poly(NBMOAC)] can be further synthesized via ring-opening metathesis polymerization ROMP with {RuCl$_2$(CHPh)[P(C$_6$H$_{11}$)$_3$]$_2$} catalyst. The structure of these compounds were determined by IR spectrometer, $^1$H NMR and $^{13}$C NMR. For $^1$H NMR (CDCl$_3$):δ=5.55, 6.08 ppm, where the resonance of double bond on vinyl side chain was observed; δ=5.16-5.30 ppm, where the resonance of double bond on the linear chain was observed after ring-opening metathesis polymerization. For $^{13}$C NMR (CDCl$_3$): δ=129.30 ppm, where the resonance of double bond on the linear chain was observed after ring-opening metathesis polymerization; δ=125.98 ppm, where the resonance of the double bond of vinyl side chain was observed.

3-2. Solubility Test

Solubility Test Under Various [M]/[I] Ratio (Concentration Ratio of Monomer to Catalyst)

Polynorbornene with vinyl side chain [Poly(NBMOAC)] may be dissolved in conventional organic solvents, and the solubilities were listed in Table 1. When the molecular weight reaches 332,000, the polymer was still dissolved in conventional organic solvents. This shows that the polymer has excellent solubility and processing properties.

TABLE 1

Solubility test under various [M]/[I] ratio (concentration ratio of monomer to catalyst) of polynorborne with vinyl side chain

| [M]/[I] | THF | DMAc | DMSO | Pyridine | CH$_2$Cl$_2$ | CHCl$_3$ | DMF |
|---|---|---|---|---|---|---|---|
| 75 | ++ | ++ | ++ | ++ | ++ | ++ | ++ |
| 150 | ++ | ++ | ++ | ++ | ++ | ++ | ++ |
| 300 | ++ | + | ++ | ++ | ++ | ++ | + |
| 500 | ++ | + | + | + | ++ | ++ | +− |
| 1000 | ++ | + | + | + | ++ | ++ | +− |
| 2000 | +− | +− | +− | + | ++ | ++ | +− |
| 3000 | +− | +− | +− | +− | ++ | ++ | +− |
| 4000 | +− | +− | +− | +− | ++ | ++ | +− |
| 8000 | +− | − | − | − | +− | +− | + |

++: soluble at room temperature,
+: soluble at 60° C.,
+−: partial soluble at 60° C.,
−: insoluble; wherein,
THF: tetrahydrofuran,
DMAc: N,N-dimetylacetamide,
DMSO: dimethylsulfoxide,
CH$_2$Cl$_2$: methylene chloride,
CHCl$_3$: trichloromethane,
DMF: N,N-dimethylforamide.

3-3 Analysis of Gel Permeation Chromatography (GPC)

The average molecular weight and molecular weight distribution of polynorbornene with vinyl side chain [Poly (NBMOAC)] formed from different [M]/[I] ratio were listed in Table 2.

TABLE 2

The average molecular weight and molecular weight distribution of [poly(NBMOAC)] formed from different [M]/[I] ratio

| *[M]/[I] | Mn(g/mol) | Molecular weight distribution (*Mw/Mn) |
|---|---|---|
| 75 | 18200 | 1.5 |
| 150 | 34500 | 1.5 |
| 300 | 55000 | 1.5 |

TABLE 2-continued

The average molecular weight and molecular weight distribution of [poly(NBMOAC)] formed from different [M]/[I] ratio

| *[M]/[I] | Mn(g/mol) | Molecular weight distribution (*Mw/Mn) |
|---|---|---|
| 500 | 95000 | 1.5 |
| 1000 | 184000 | 1.6 |

*[M]/[I] means concentration ratio of monomer to catalyst
*Mw was weight-average molecular weight; Mn was number-average molecular weight Altering the concentration ratio of monomer to catalyst ([M]/[I]) may obtain polymers with different molecular weight which increases with [M]/[I] ratio. However, the alteration of molecular weight distribution was not obvious, and the molecular weight distribution was still narrow. Even when the molecular weight was 332,000, the molecular weight distribution was still narrow (PDI=1.7).

3-4. Differential Scanning Calorimeter (DSC) Analysis of Monomer Norbornene with Vinyl Side Chain The melting point of monomer norbornene with vinyl end was 62° C. which was determined by differential scanning calorimeter (DSC). On the other hand, for the analysis of glass transition temperature (Tg) of monomer norbornene with vinyl side chain, no melting transition was observed. However, in the DSC analysis, an exothermal peak was observed at 176° C., which demonstrates a double bond exists at the end of the side chain.

EXAMPLE 4

AB Cross-linking Reaction Between Polynorbornene with Vinyl Side Chain [poly(NBMOAC)] and Methyl Methacrylate The AB cross-linked polymer of polynorbornene with vinyl side chain and methyl methacrylate may increase the thermal stability and chemical resistance of polymethyl methacrylate (PMMA) derived hybrid materials. The polynorbornene with vinyl side chain and methyl methacrylate were mixed and then added with heat-induced initiator such as benzoyl peroxide (BPO) or azobisisobutyornitrile (AIBN). The heat-induced initiator was further added in the mixture to generate radicals, and the double bond on the side chain of poly(NBOMAC) was thus cross-linked with methyl methacrylate to form AB cross-linked polymer hybrid materials.

Monomer norbornene with vinyl end (NBMOAC) was dissolved in 4 ml of methylene chloride and then added with catalyst solution of {RuCl$_2$(CHPh)[P(C6H$_{11}$)$_3$]$_2$}. After completion of polymerization, the solvent was removed under decreased pressure, and specific amount of methyl methacrylate was added to the reactor to dissolve polynorbornene with vinyl end [poly(NBMOAC)] wherein the weight ratios of poly(NBMOAC) and methyl methacrylate were individually 1% and 5%. Benzyol peroxide (BPO) (1%) was added in the polymer solution which was then degassed via freeze-pump-thaw cycle. After heating at 90° C. for 24 hr, polymerization of methyl methacrylate radicals and cross-linking reaction of polynorbornene were performed simultaneously. AB cross-linking polymer formed from such reaction was insoluble in benzene, toluene, chloroform and methylene chloride; nevertheless, pure methyl methacrylate was soluble in said organic solvents. This demonstrates that the cross-linking reaction, increasing the chemical resistance of polymer, between poly(NBMOAC) and methyl methacrylate was successful in this example.

Thermal Properties Analysis

For strongly proving the cross-linking reaction, we perform differential scanning calorimeter (DSC) and thermogravimetric analysis (TGA) tests. An exothermal peak of poly(NBMOAC) appearing at 176° C. represented the double bond of methyl methacrylate exists in the polymer; conversely, for the AB cross-linking system of poly(NBMOAC) and methyl methacrylate, this peak disappears, and no phase transition was observed. This suggested that the double bond of methyl methacrylate no longer exists in the AB cross-linking polymer.

The cross-linking reaction usually increased the thermal stability of polymers, and this effect would show in the decomposition temperature ($T_d$). The thermogravimetric analysis demonstrated that thermal stability of said cross-linking material altered after introducing poly(NBMOAC) to cross-linking polymers. According to the results, thermal stability of polymers increased with the ratio of poly(NBMOAC) to methyl methacrylate. For comparison with pure methyl methacrylate, adding 1% of poly(NBOMAC) increased 13.5° C. on thermal stability while 5% of poly (NBOMAC) increased 20.5° C.

FIG. 1 systematically illustrated the process for preparing the cross-linkable norbornene compounds and their derived polymers of the present invention, wherein the cross-linkable group of norbornene compounds was utilized to prepare various cross-linking hybrid materials. With reference of formula B, poly(NBMOAC) was cross-linked at 60° C. via heat-initiated radical polymerization with azobisisobutyronitrile (AIBN) as initiator. The glass transition temperature ($T_g$) of prepared cross-linking hybrid material was 28° C. Then transferring to formula C, a cross-linked hybrid material with high glass transition temperature (197° C.) was obtained after thermal treatment at high temperature (220° C.), and said cross-linked hybrid material was insoluble in conventional organic solvents.

On the other hand, polynorbornene with cross-linkable olefin side chain [poly(MMNAB)] may be prepared according to formula C via heat-initiated radical polymerization of norbornene with cross-linkable olefin side chain (MMNAB) at 60° C. Azobisisobutyronitrile (AIBN) was used as an initiator. The glass transition temperature of such poly (MMANB) was 115° C. $^1$H NMR spectra of poly(MMNANB) showed the resonance (5.55 and 6.08 ppm) of hydrogen of methyl methacrylate disappeared after thermopolymerization, but the resonance (5.95 and 6.16 ppm) of hydrogen of the double bond on norbornene still remained. Therefore, we suggested that polynorbornene with cross-linkable olefin side chain [poly(MMNAB)] was successfully prepared. Poly(MMNAB) was soluble in organic solvents such as N-dimethylsulfoxide (DMSO) N,N-dimethylformamide (DMF) N,N-dimethylacetamide (DMAc) tetrahydrofuran (THF) pyridine, methylene chloride, chloroform, benzene, toluene or xylene. After that, the double bone of side chain of poly(MMANB) was cross-linked at 30° C. through ring-opening metathesis reaction as formula E to form a cross-linked hybrid material. The glass transition temperature ($T_g$) of the hybrid material was 180° C.

COMPARISON EXAMPLE

Suitable amount of newly synthesized norbornene monomer with cross-linkable olefin side chain (NBMMAI and NBMM) was dissolved in 5 ml of methylene chloride and then degassed and dehydrated thrice via freeze-pump-thaw cycle under vacuum. Suitable amount of {RuCl$_2$(CHPh)[P(C$_6$H$_{11}$)$_3$]$_2$} was dissolved in 0.5 ml of methylene chloride and added into the reactor at room temperature. Insoluble gel occurred after stirring the mixture for 10 minutes. If inhibitor p-methoxy phenol (MEHQ) was added to the reaction, the insoluble gel still occurred. On the contrary, norbornene monomers with olefin end (NBOAC) of the present invention may be successfully used for preparing polynorbornene with cross-linkable groups whether MEHQ inhibitor was present or absent, as shown in Table 3.

TABLE 3

Effect of various monomers on molecular weight and molecular weight distribution in the ring-opening metathesis polymerization[a]

| Polymer code | Monomer[c] | [M]/[cat] | Inhibitor | $M_n$[b] (g·mol$^{-1}$) | Mw/Mn |
|---|---|---|---|---|---|
| 1 | NBMOAC | 1000 | — | 144,000 | 1.8 |
| 2 | NBMOAC | 1000 | MEHQ[d] | 139,000 | 1.8 |
| 3 | NBMMAI | 1000 | — | Gelation[e] | — |
| 4 | NBMMAI | 1000 | MEHQ[d] | Gelation[e] | — |
| 5 | NBMM | 1000 | — | Gelation[e] | — |
| 6 | NBMM | 1000 | MEHQ[d] | Gelation[e] | — |

[a] Experiment conditions: monomer and Ru catalyst II in $CH_2Cl_2$; [M]/[cat] = 1000; temperature (30° C.).
[b] Molecular weight determined by GPC (polystyrene was used as a standard).
[c] 5-(methacryloyloxyethylaminocarboxylmethyl)bicyclo[2.2.1]hept-2-en-e (NBMOAC); 5-(methyl methacryloyl isocyanate)bicyclo [2.2.1]hept-2-ene (NBMMAI); 5-(methacryloyl methyl)bicyclo[2.2.1]hept-2-ene (NBMM).
[d] MEHQ (p-methoxy phenol) = 20 mol %.
[e] Gel formation during the polymerization.

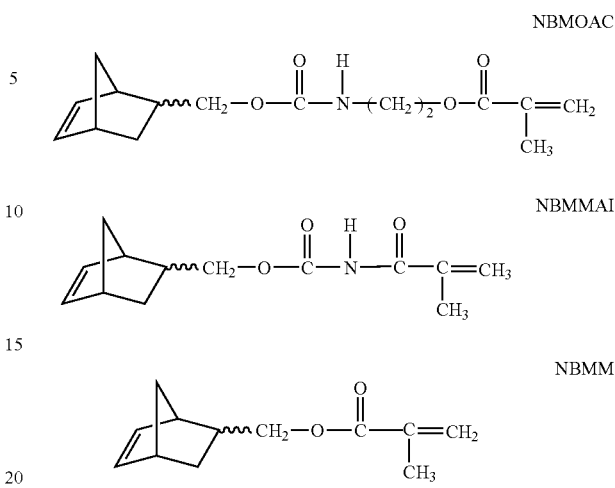

EXAMPLE 5

Preparation of Block Co-Polymer with Phthalamide and Olefin Ends [poly(NBMPI-b-NBMOAC)]

The reaction was as following:

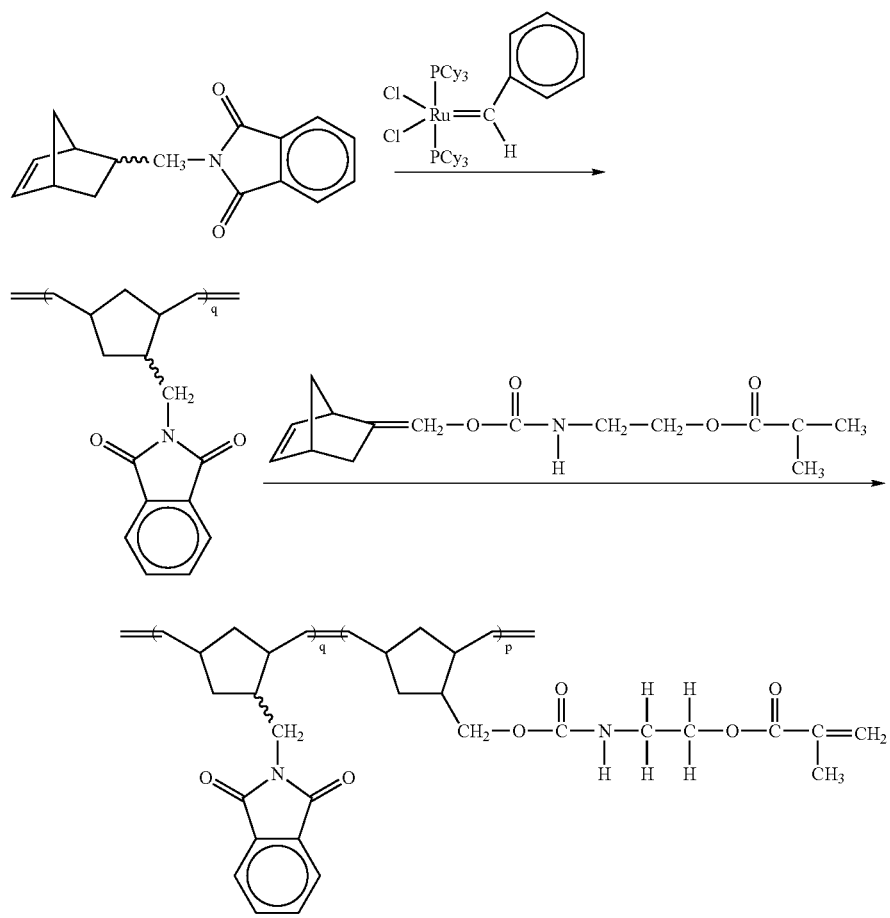

This example illustrated the process to prepare some block co-polymers with various chain lengths through polymerization of norbornene monomers with phthalamide group and norbornene monomer with olefin end.

Norbornene monomer with phthalamide group (NBMPI, 0.3074 g) was dissolved in 10 ml of methylene chloride in a reactor with highly vacuum system. The solution was dehydrated and degassed thrice via a freeze-pump-seal-thaw cycle to give a condensed monomer solution. After that, 0.01 g of {RuCl$_2$(CHPh)[P(C$_6$H$_{11}$)$_3$]$_2$} catalyst was taken from an argon-filled dry-box and dissolved in 0.5 ml of methylene chloride followed by being injected in said condensed monomer solution with a syringe. After pumping for some time, the reactor thaws at room temperature (around 25° C.) with stirring for 2 hr. The final solution was precipitated from 1000 ml of methanol. From the procedure mentioned above, various block co-polymers with different chain lengths were prepared by changing the amount of those two monomers, and the products were characterized by $^1$H NMR and $^{13}$C NMR.

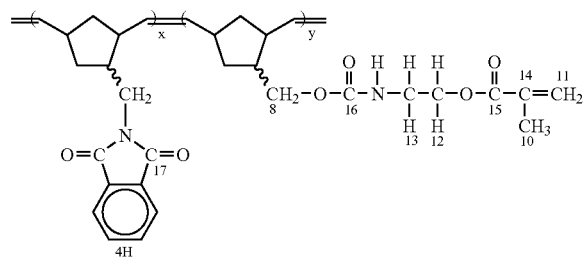

$^1$H NMR (CDCl$_3$): δ(ppm)=0.8-3.0(H of cycloester on norbornene after ring opening), 1.5(H$_{10}$), 3.4-3.5(H$_{n8}$), 3.76 (H$_{13}$), 3.95(H$_{12}$), 4.12(H$_{x8}$), 5.0-5.3(H$_{cis}$ of double bond on norbornene linear chain after ring opening), 5.37(H$_{trans}$ of double bond on norbornene linear chain after ring opening), 5.0, 6.04(H$_{11}$), 7.4-7.8(H$_{4H}$).

$^{13}$C NMR (CDCl$_3$) : δ(ppm)=19(C$_{10}$), 31-68(C$_{n8}$), 36-46 (C of cycloester on norbornene after ring opening), 124, 132.5, 134(aromatic group), 120-136(C of double bond on norbornene linear chain after ring opening), 169 (C$_{16,17}$)

Analysis of Gel Permeation Chromatography (GPC)

Various block co-polymers of norbornene with phthalamide group and olefin side chain were prepared by polymerization under different [M]/[I] ratio ([M]-monomer concentration, [I]=catalyst molar concentration). The number-average molecular weight and molecular weight distribution were listed in Table 3.

The results showed that various polymers with different chain length may be prepared by altering the ratio of [M]$_{NBMPI}$/[I] ([M]=NBMPI monomer concentration, [I]=catalyst molar concentration) to [M]$_{NBMOAC}$/[I] ([M]=NBMOAC monomer concentration, [I]=catalyst molar concentration). The molecular weight of the polymer increased with said ratio, but the polydispersity was still narrow (PDI=1.50~1.67) thought it lightly increased. In addition, only one peak was observed in the molecular weight curve. These results demonstrated the block co-polymer of this example was successfully prepared.

TABLE 4

The number-average molecular weight and molecular weight distribution of block co-polymers of norbornene monomer with phthalamide group and olefin side chain between different [M]/[I] ratio

| [M]/[I]$_{NBMPI}$ / [M]/[I]$_{NBMOAC}$ | Mn(g/mol) | Mw/Mn |
|---|---|---|
| 100:0 | 25800 | 1.50 |
| 100:25 | 38100 | 1.51 |
| 100:50 | 39800 | 1.56 |
| 100:75 | 42800 | 1.67 |

Solubility Analysis

Introduce of norbornene monomers with olefin end (NBOAC) to the polymer leaded the polymer resistant to toluene, xylene, dichlorobenzene and to be dissolved in tetrahydrofuran, N,N-dimethylethamide, N,N-dimethylforamide, methylene chloride and chloroform. The solubility was listed in Table 4.

TABLE 5

Solubility of block co-polymers of norbornene with phthalamide group and olefin side chain under different [M]/[I]ratio

| [M]/[I]$_{NBMPI}$ / [M]/[I]$_{NBMOAC}$ | THF | DMAc | pyridine | DMSO | 1,2-dichlorobenzene | xylene | toluene | CH$_2$Cl$_2$ | CHCl$_3$ | DMF |
|---|---|---|---|---|---|---|---|---|---|---|
| 100:0 | ++ | ++ | ++ | − | ++ | ++ | ++ | ++ | ++ | ++ |
| 100:25 | ++ | ++ | ++ | − | ++ | ++ | ++ | ++ | ++ | ++ |
| 100:50 | ++ | ++ | ++ | − | ++ | ++ | ++ | ++ | ++ | ++ |
| 100:75 | ++ | ++ | ++ | − | ++ | ++ | ++ | ++ | ++ | |
| 0:75 | ++ | ++ | ++ | ++ | − | − | − | ++ | ++ | ++ |

++: soluble at room temperature,
+: soluble at 60° C.,
+−: partial soluble at 60° C.,
−: insoluble; wherein,
THF: tetrahydrofuran,
DMAc: N,N-dimetylacetamide,
DMSO: dimethylsulfoxide,
CH$_2$Cl$_2$: methylene chloride,
CHCl$_3$: trichloromethane,
DMF: N,N-dimethylforamide.

EXAMPLE 6

Preparation of Water-soluble Block Co-polymer with Vinyl Side Chain

Norbornene monomer with phthalamide group (NBMPI) contained phthalamide groups which may be hydrated with hydrazine to form amino group. The amino group may react with gaseous hydrochloride to form ammonium group and transform to a water-soluble polymer.

The synthesis process was as following:

block co-polymer with phthalamide and olefin end group [poly(NBMPI-b-NBMOAC)] (0.5 g), ethanol (20 ml) and hydrazine (2 ml) were put in 200 ml ampoule and added with small amount of anti-oxidant (BHT). The ampoule was connected with highly vacuum system, and the reaction performed thrice of freeze-pump-seal-thaw cycles. The reactor thawed at room temperature and was then heated to 100° C. with stirring for 5 h until reaction solution became homogeneous. The reactor was then cooled in room temperature, and the solution was subsequently transferred from ampoule to 50 ml tri-mouth bottle. Gaseous HCl was introduced into the solution which was then stirred for 3 hr. After removing ethanol from the solution by rotational evaporation, 5 ml of water was added to dissolve water-soluble polymer salts which were then filtered with filter paper. The filtrate was precipitated in 500 ml of acetone to give water-soluble polymer which was then dried under vacuum at room temperature.

The synthesis reaction was as following $^{13}$C NMR (CDCl$_3$): δ(ppm)=36-46 (C of cycloaliphatic on norbornene after ring opening).

EXAMPLE 7

Preparation of AB Cross-linked Polymer of Poly(NBMPI-b-NBMOAC) and Polymethyl Methacrylate For increasing the thermal stability and chemical resistance of polymethyl methacrylate, methyl methacrylate was added in block co-polymer with vinyl side chain [poly (NBMPI-b-NBMOAC)] to lead the double bond of methylacryl acid group (—C(CH$_3$)=CH$_2$) on the side chain of norbornene to cross-link with methyl methacrylate and to form AB cross-linked polymers.

Hence, 0 wt %, 5wt % and 10 wt % of block co-polymer with vinyl side chain [poly(NBMPI-b-NBMOAC)] and methyl methacrylate were separately put in an ampoule and added with benzoyl peroxide (BPO) as initiator. The ampoule was connected with highly vacuum system, and the reaction performed thrice of freeze-pump-seal-thaw cycles. The ampoule stood in room temperature and was then heated to 80° C. with stirring for about 8 hr. The ampoule was then cooled to room temperature, and the solution was precipitated in 500 ml of methanol to give cross-linking polymer which was subsequently filtered and dried under vacuum at room temperature.

The thermal property of cross-linked block co-polymer was determined by differential scanning calorimeter (DSC) and thermogravimetric analysis (TGA) tests. The thermal properties increased with the ratio of block co-polymer with

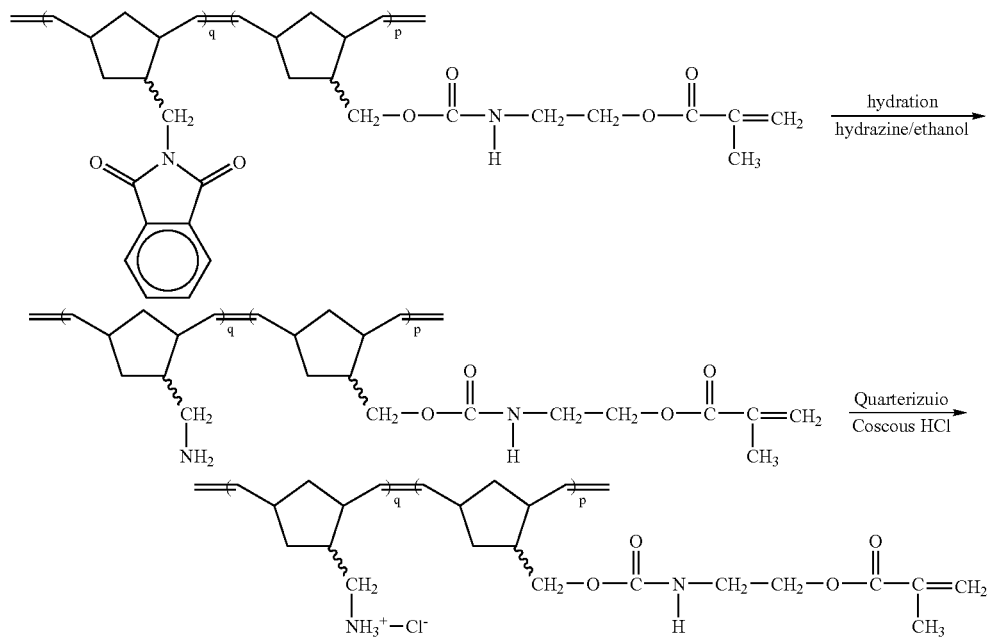

Two newly synthesized solvent-philic polymers may be dissolved in water and then measured with $^1$H NMR (D$_2$O). A—NH$_3^+$ peak was observed at 2.0~2.2 ppm.

$^1$H NMR (D$_2$O): δ(ppm)=0.8-3.9 (H of cyclic ester on norbornene after ring opening), 2.25 (N$_3^+$), 5.3-5.7 (H$_{cis}$ and H$_{trans}$ of double bond on norbornene linear chain after ring opening).

vinyl side chain [poly(NBMPI-b-NBMOAC)] to methyl methacrylate. For comparison with pure methyl methacrylate, adding 5% of [poly(NBMPI-b-NBMOAC)] in methyl methacrylate (MMA) system increased 5° C. on thermal stability under nitrogen while adding 10% of poly (NBOMAC) increased 20° C. The thermal stability of block co-polymer with vinyl side chain [poly(NBMPI-b-NB- MOAC)] cross-linking with themselves was 65.6° C. higher than pure methyl methacrylate.

EXAMPLE 8

Preparation of Block Co-polymer of Carbazole with Different Chain Lengths and Norbornene with Cross-linkable Olefin Grou This example illustrated the polymerization of carbazol-containing norbornene monomers (CbzNB) and norbornene monomers with cross-linkable olefin group (NBMOAC) for preparing block co-polymers with different chain lengths. The synthesis reaction was as following:

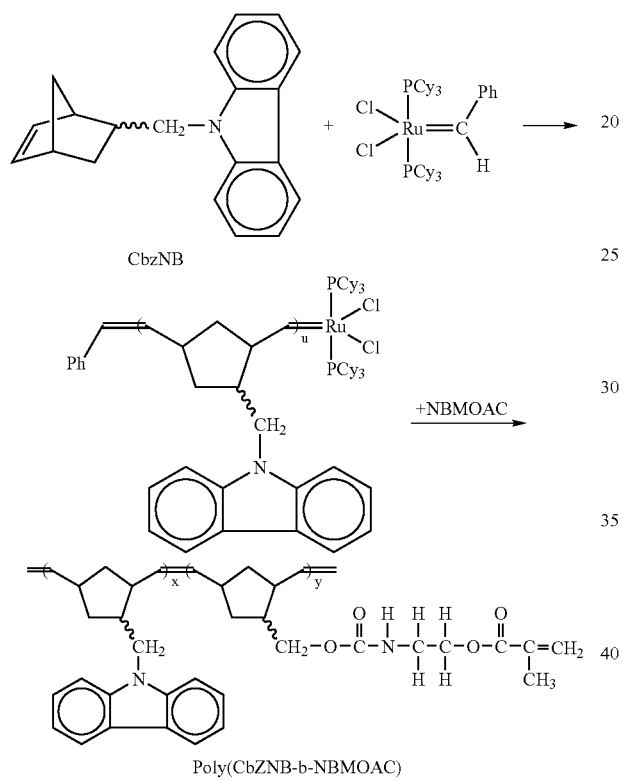

Poly(CbZNB-b-NBMOAC)

Equal molar of KOH (12 g) and carbazole (30 g) were put in a reactor and added with 200 ml of xylene. Water and xylene were then removed to give potassium carbazole. Subsequently, potassium carbazole was added in N,N-dimethylformamide(DMF) which was gradually added with 25 g of norbornene chloromethane and refluxed for 12 h. After completion of reflux, the solution was extracted with water and ethyl acetate for three times, and the solvent was removed by rotational condensation. The crude carbazole-containing norbornene monomers was obtained by chromatography and then recrystallized in n-hexane to form refined carbazole-containing norbornene monomers.

Next, 2.5 mmol of CbzNB was dissolved in 4 ml of methylene chloride in a reactor with highly vacuum system. The solution was dehydrated and degassed thrice via a freeze-pump-seal-thaw cycle to give a condensed monomer solution. After that, 2 g of $\{RuCl_2(CHPh)[P(C_6H_{11})_3]_2\}$ catalyst was taken from an argon-filled dry-box and dissolved in 1 ml of methylene chloride followed by being injected in said condensed monomer solution with a syringe and pumped.

The reactor then thawed at room temperature (about 25° C.) with stirring for 30 min, and 0.5 mmol of NBMOAC monomers was injected to the reactor with syringe when the solution kept red. After stirring for 12 h, 0.1 ml of ethyl vinyl ether was added to terminate the polymerization, and the solution was precipitated in 500 ml of methanol to give poly(CbzNB-b-NBMOAC). Poly(CbzNB-b-NBMOAC) was dissolved in methylene chloride and thrice precipitated in methanol to form refined polymer. The refined polymer was dried under vacuum at room temperature.

Various block co-polymers [poly(CbzNB-b-NBMOAC)] with different chain lengths may be prepared by altering the amount of these two monomers. For $^1$H NMR spectra of the block co-polymer [poly(CbzNB-b-NBMOAC)], the peak of H of carbazole was observed at 7.05 to 8.00 ppm, where was the specific resonance of H of carbazole; the peak of H of olefin side chain was observed at 5.01 to 6.04 ppm; the peak of H of double bond on linear chain was observed at 5.08 to 5.50 ppm, where was the specific resonance of polynorbornene

EXAMPLE 9

Synthesis of Norbornene Monomers with Epoxy Groups (NBMEG)

Norbornene monomers with epoxy groups (NBMEG) may be synthesized in high-pressure reactor via Diels-Alder reaction, wherein cyclopentadiene reacted with alkene with functional group, such as allyl glycidyl ether.

Allyl glycidyl ether, one example of alkenes, usually reacted with cyclopentadiene via Diels-Alder reaction at 180° C.; the boiling temperature of cyclopentadiene was 41° C. while the boiling temperature of Allyl glycidyl ether was 154° C. So this reaction must perform in a high-pressure reactor. Synthesis process was as following:

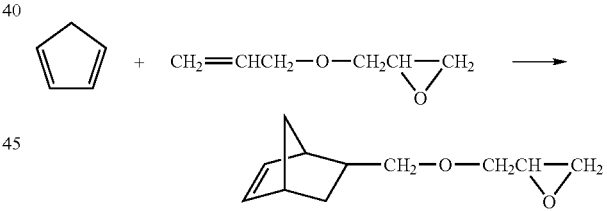

Cyclopentadiene (50 g), 1 equiv. of allyl glycidyl ether and 1 g of hydroquinone were put in a high-pressure reactor to react at 180° C. for 12 h. Resulting solution was vacuum-pumped at room temperature to remove unreacted cyclopentadiene and allyl glycidyl ether. Such solution was further distilled under vacuum to get norbornene derivatives—norbornene monomers with epoxy groups (NBMEG).

In IR spectra of NBMEG, C═C adsorption was observed at 1560 cm$^{-1}$, C—O—C adsorption was observed at 1099 cm$^{-1}$, and oxirane adsorption was observed at 905 cm$^{-1}$.

EXAMPLE 10

Synthesis of Polynorbornene Monomers with Epoxy Groups [poly(NBMEG)]

Synthesis Process for polynorbornene monomers with epoxy groups [poly(NBMEG)] was as following:

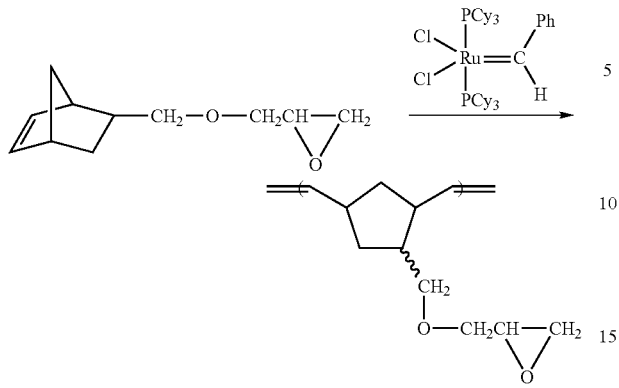

NBMEG (0.24 g, 1.3×10$^{-3}$ mol) was dissolved in 5 ml of methylene chloride and dehydrated and degassed under vacuum. {RuCl$_2$(CHPh)[P(C$_6$H$_{11}$)$_3$]$_2$} catalyst (0.001 g, 1.2.times. 10$^{-6}$ mol) was dissolved in 1 ml of methylene chloride and injected into reactor at room temperature with stirring for 24 hr. The solution was precipitated in methanol to form polynorbornene monomers with epoxy groups [poly(NBMEG)] which was then lyophilized. Yield: 45%.

In IR spectra of poly(NBMEG), C=C adsorption was observed at 1589 cm$^{-1}$ after ring opening, C—O—C adsorption was observed at 1098 cm$^{-1}$, and oxirane adsorption was observed at 906 cm$^{-1}$.

Poly(NBMGE) further performed conventional ring-opening process of epoxy, such as photo-initiated cation ring-opening polymerization (the reaction was shown as following), and poly(NBMGE) transformed to polymers with cross-linkable epoxy groups which further provided novel cross-linked hybrid polymers.

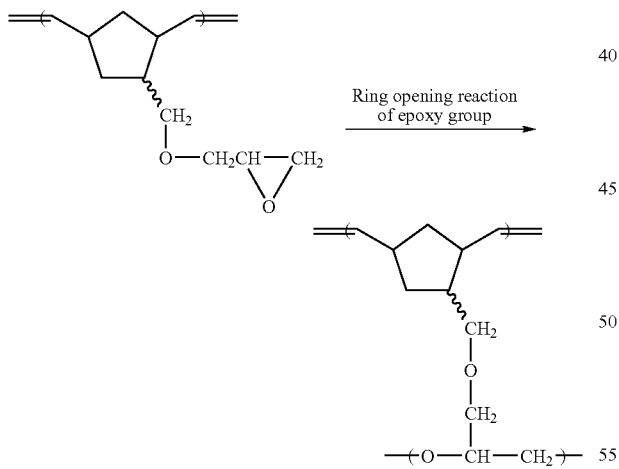

EXAMPLE 11

Synthesis of Polynorbornene Monomers with Cross-linkable Epoxy Side Chain [poly(HNBMEG)]

Polynorbornene monomers with epoxy groups [poly(NBMEG)] (0.5 g), 2.75 g of p-toluenesulfonylhydrazide hydrogenating agent and small amount of 2,6-di-tertbutyl-4-methylphenol anti-oxidant were dissolved in 50 ml of xylene and dehydrated and degassed under vacuum. The reactor stood at 120° C. with stirring for 6 hr. The solution was lyophilized to form the product. The reaction was as following:

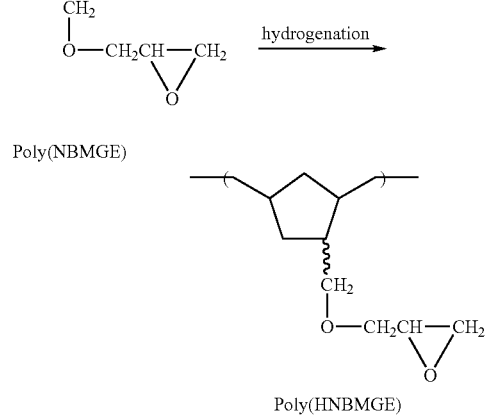

Poly(HNBMGE) formed from poly(NBMGE) further performed conventional ring-opening process of epoxy, such as photo-initiated cation ring-opening polymerization, and poly(HNBMGE) transformed to polymers with cross-linkable epoxy groups as the following formula and to further provide novel cross-linking hybrid polymers.

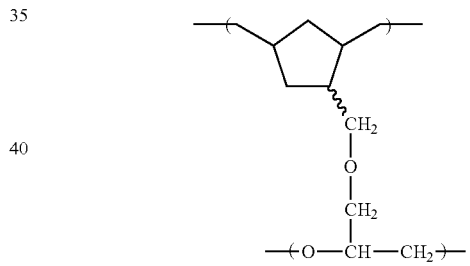

Polynorbornene monomers with epoxy groups [poly(NBMEG)] or [poly(HNBMEG)] of the present invention may be cross-linked by heating or at room temperature in the presence of cross-linking agent. The cross-linking agents were those might react with epoxy side chain via ring opening adding reaction, for example, amino compounds. For primary amino cross-linking agent, the reaction was:

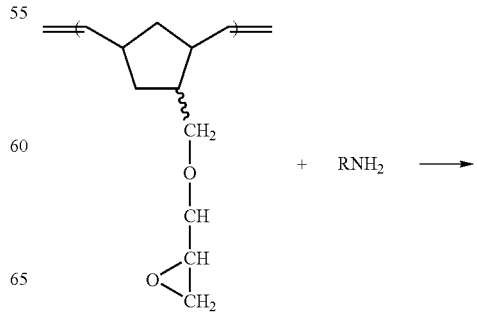

-continued

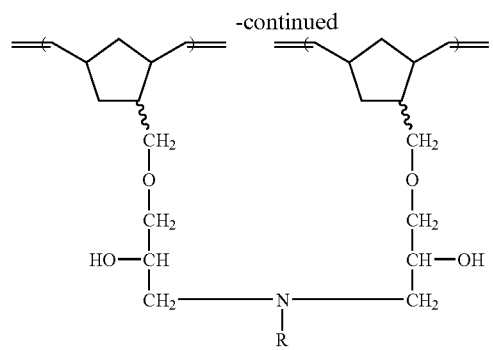

and

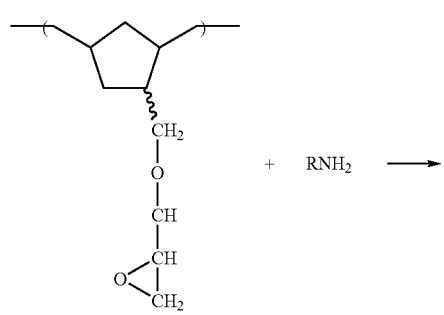
+ RNH₂ ⟶

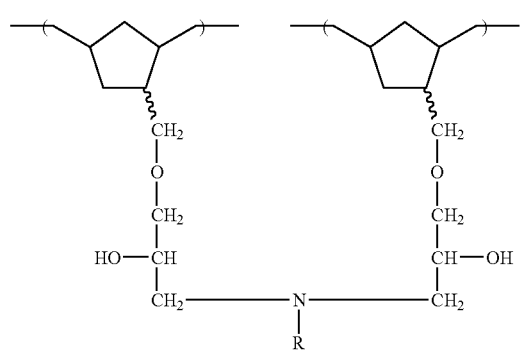

Anhydride compounds, diacid compounds, or the mixture of acids and hydrides may react with —OH to form esters and further to form cross-linked hybrid materials.

Characterization of Poly(NBMEG)

11-1. Characterization of Groups

In prior art, gel was often observed in the ring-opening metathesis polymerization (ROMP) of monomers with cross-linkable side chain. Nevertheless, monomer norbornene with epoxy group (NBMEG) was successfully synthesized in the present invention via ROMP in the presence of {RuCl₂(CHPh)[P(C₆H₁₁)₃]₂} catalyst. The structures of the compounds were determined by $^1$H NMR and $^{13}$C NMR. For $^1$H NMR (CDCl₃), a resonance of double bond of linear chain was observed at 5.0-5.5 ppm.

11-2. Solubility Test

Poly(NBMGE) has excellent solubility, it may be dissolved in 1,2-dichloro benzene, THF, DMAc, DMSO, pyridine, xylene, toluene CH₂Cl₂, CHCl₃, and DMF.

11-3. Analysis of Gel Permeation Chromatography (GPC)

The average molecular weight and molecular weight distribution of poly(NBMEG) formed from different [M]/[I] ratio were listed in Table 6.

TABLE 6

The average molecular weight and molecular weight distribution of [Poly(NBMEG)] formed from different [M]/[I] ratio

| [M]/[I] | Mn(g/mol) | Molecular distribution *(Mw/Mn) |
|---|---|---|
| 500 | 15000 | 1.6 |
| 1000 | 35000 | 1.6 |
| 2000 | 39800 | 1.6 |
| 4000 | 42800 | 1.8 |

*[M]/[I] means concentration ratio of monomer to catalyst
*Mw was weight average molecular weight, Mn was number average molecular weight.

Un-hydrogenated poly(NBMEG) might be dissolved in conventional organic solvents but became insoluble after hydrogenation. Besides, various polymers with different molecular weight may be obtained by changing the ratio of [M]/[I]. When [M]/[I]=500, $M_n$=15,000, $M_w/M_n$=1.6; while [M]/[I]=1,000, $M_n$=35,000, $M_w/M_n$=1.8. The polymer molecular weight increased with the [M]/[I] ratio, and the molecular weight distribution was narrow ($M_w/M_n$=1.6-1.8).

EXAMPLE 12

Preparation of Block Co-Polymer of Norbornene with Phthalamide and Epoxy Groups [poly(NBMPI-b-NBMOAC)] with Different Chain Lengths This example illustrated the polymerization of norbornene monomers with phthalamide group (NBMPI) and norbornene monomers with epoxy group (NBMEG) for preparing block co-polymers with different chain lengths. The synthesis reaction was as following:

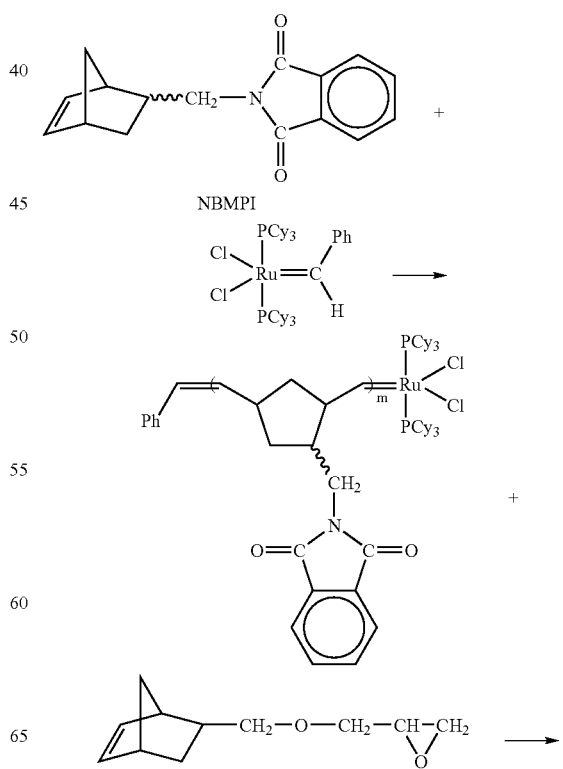

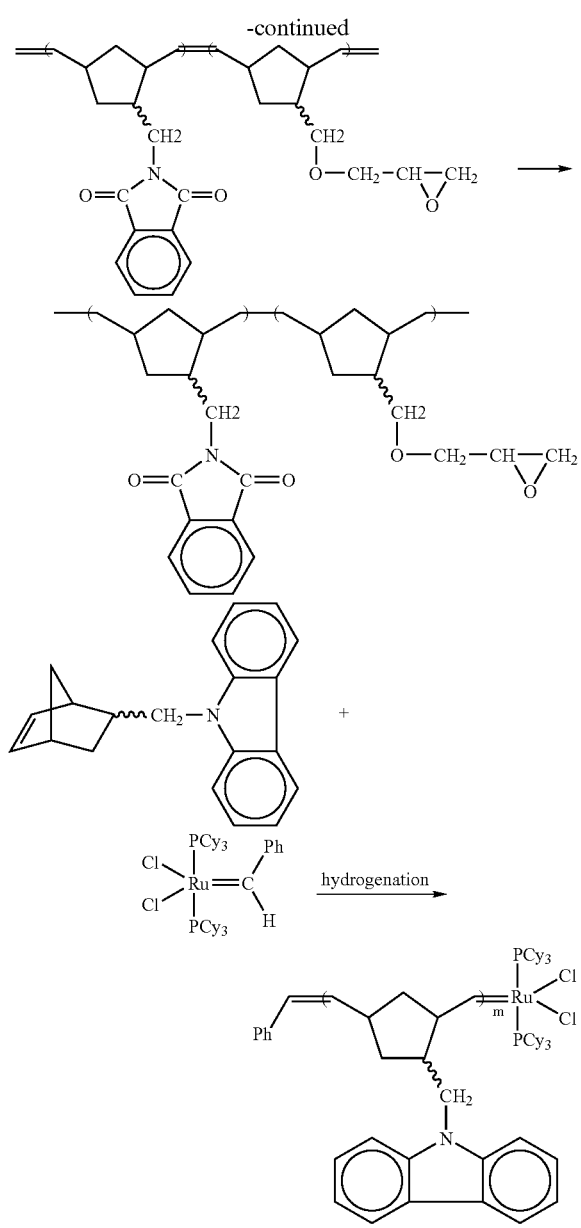

-continued

+ hydrogenation → ethyl vinyl ether was added to terminate the polymerization, and the solution was precipitated in 500 ml of methanol. Polymer thus obtained was dissolved in methylene chloride and thrice precipitated in methanol to form refined polymer. The refined polymer was dried under vacuum at room temperature.

In the process mentioned above, a mono peak in GPC curve was observed after altering the ratio of the two monomers. Block co-polymers with different chain lengths were successfully prepared. For the $^1$H NMR spectra of said block co-polymer, H of phthalimide group was observed at 7.20~7.71 ppm, where was the specific resonance of H of phthalimide group; H of double bond on linear chain was observed at 5.23~5.51 ppm, where was the specific resonance of H of polynorbornene.

For IR spectra, C=C adsorption after ring opening was observed at 1590 cm$^{-1}$, C—O—C adsorption was observed at 1098 cm$^{-1}$, and oxirane adsorption was observed at 910 cm$^{-1}$.

Molecular weight and polydispersity (PDI) was determined by GPC, when [M]/[I] was 1,000 and Mn was 271300, the PDI was 1.67. With thermal analysis of DSC and TGA, Tg of the polymer was 117° C., $T_d$ 10% was 400° C. wherein $T_d$ 10% represented the temperature when weight loss reaches 10% after TGA measurement.

Block co-polymer of norbornene with phthalamide and epoxy groups was dissolved in THF and measured by UV spectrometer. The measured transmittance was 94%. Such polymer has excellent transparency.

Next, said block co-polymer of norbornene with phthalamide and epoxy groups and excess of hydrazine (NH$_2$-NH$_2$) were dissolved in ethanol to react at 120° C. for 6 hr. A block co-polymer with cross-linkable olefin group and modifiable amino group was thus obtained, and the polymer had well-controlled molecular weight and narrow molecular weight distribution. The structure of this polymer was as following:

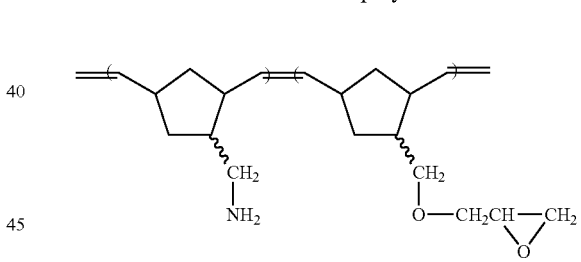

Norbornene methylene amine (20 g), phthalic anhydride (30 g), and chloroform (80 ml) were put in 250 ml of tri-mouth bottle and refluxed for 12 h and rotationally evaporated to remove chloroform. Norbornene phthalimide (NBMPI) was recrystallized in n-hexane, and the melting point of NBMPI monomers was 99 to 101° C.

Next, 2.5 mmol of NBMPI was dissolved in 4 ml of methylene chloride in a reactor with highly vacuum system. The solution was dehydrated and degassed thrice via a freeze-pump-seal-thaw cycle to give condensed monomer solution. After that, 2 g of {RuCl$_2$(CHPh)[P(C$_6$H$_{11}$)$_3$]$_2$} catalyst was taken from an argon-filled dry-box and dissolved in 1 ml of methylene chloride followed by being injected in said condensed monomer solution with a syringe and pumped. The reactor then thawed at room temperature (about 25° C.) with stirring for 30 min, and 0.5 mmol of NBMEG monomers was injected to the reactor with syringe when the solution kept red. After stirring for 12 hr, 0.1 ml of

EXAMPLE 13

Preparation of Block Co-polymer of Carbazole and Epoxy Groups with Different Chain Length This example illustrated the polymerization of carbazole-containing norbornene monomers (CbzNB) and norbornene monomers with epoxy group (NBMEG) for preparing block co-polymers with different chain length. The synthesis reaction was as following:

equal molar of KOH (12 g) and carbazole (30 g) were put in a reactor and added with 200 ml of xylene. Water and xylene were then removed to give potassium carbazole. Subsequently, potassium carbazole was added in N,N-dimethylformamide(DMF) which was gradually added with 25 g of norbornene chloromethane and refluxed for 12 h. After reflux, the solution was extracted with water and ethyl acetate for three times, and the solvent was removed by rotational condensation. The crude carbazole-containing norbornene monomers were obtained by chromatography and recrystallized in n-hexane to form refined carbazole-containing norbornene monomers.

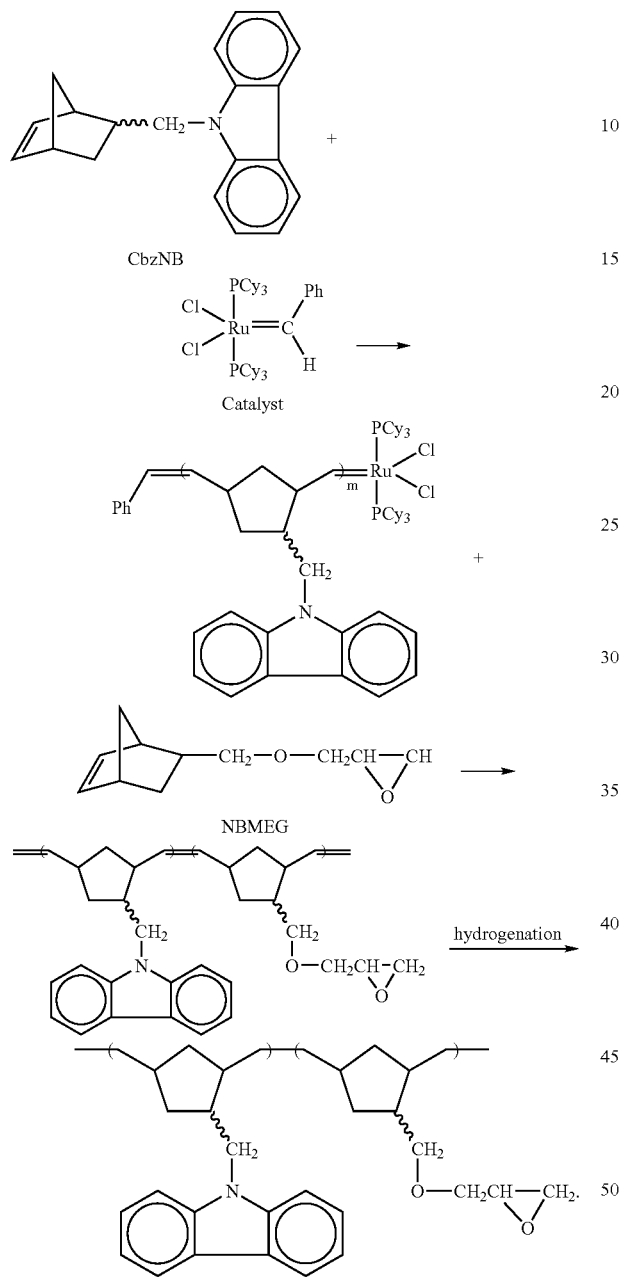

Next, 2.5 mmol of CbzNB was dissolved in 4 ml of methylene chloride in a reactor with highly vacuum system. The solution was dehydrated and degassed thrice via a freeze-pump-seal-thaw cycle to give condensed monomer solution. After that, 2 g of {RuCl$_2$(CHPh)[P(C$_6$H$_{11}$)$_3$]$_2$} catalyst was taken from an argon-filled dry-box and dissolved in 1 ml of methylene chloride followed by being injected in said condensed monomer solution with a syringe and then pumped.

The reactor then thawed at room temperature (about 25° C.) with stirring for 30 min, and 0.5 mmol of NBMEG monomers was injected to the reactor with syringe when the solution kept red. After stirring for 12 h, 0.1 ml of ethyl vinyl ether was added to terminate the polymerization, and the solution was precipitated in 500 ml of methanol to give poly(CbzNB-b-NBMOAC). Poly(CbzNB-b-NBMOAC) was dissolved in methylene chloride and thrice precipitated in methanol to form refined polymer. The refined polymer was dried under vacuum at room temperature.

Various block co-polymers [poly(CbzNB-b-NBMOAC)] with different chain lengths may be prepared via altering the amount of CbzNB and NBMEG monomers. For $^1$H NMR spectra of the block co-polymer, the peak of H of carbazole was observed at 7.07 to 7.95 ppm, where was the specific resonance of H of carbazole; the peak of H of double bond on linear chain was observed at 5.09 to 5.51 ppm, where was the specific resonance of polynorbornene.

For IR spectra, C=C adsorption was observed at 1590 cm$^{-1}$ after ring opening, C—O—C adsorption was observed at 1099 cm$^{-1}$, and oxirane adsorption was observed at 908 cm$^{-1}$.

Molecular weight and polydispersity (PDI) was determined by GPC, when [M]/[I] was 500, Mn was 14200, and the PDI was 1.66. With thermal analysis of DSC and TGA, $T_g$ of the polymer was 157° C., and $T_d$ 10% was 413° C.

For the electrochemistry analysis, block co-polymer of carbazole and epoxy groups was dissolved in THF and measured by cyclic voltameter with scanning rate of 100 V/sec. Cyclic voltammetric waves showed that electrochemical evaporation occurred at 1.6 V. Block co-polymer of carbazole and epoxy group had electrochemical activities.

For measuring transparency, block co-polymer of carbazole and epoxy groups was dissolved in THF and measured by UV spectrometer. The measured transmittance was 93%. Such polymer had excellent transparency.

EXAMPLE 14

Preparation of Polynorbornene with Olefin End from Norbornene Monomer with Epoxy End The synthesis reaction was as following:

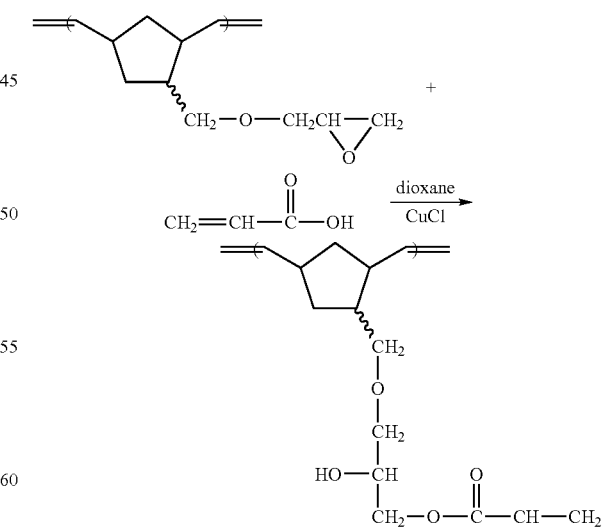

NBMEG (5 g, 0.05 mol) was dissolved in 50 ml of benzene and added with 3.6 g (0.05 mol) of acrylic acid and 0.005 g (0.5 mol) of cuprous chloride (CuCl) and then heated by oil-bath at 80° C. for 24 hr. After completion of reaction, the solution was precipitated in methanol and the CuCl was washed out to form a white solid which was then lyophilized. Yield: about 85%.

Polynorbornene with olefin group formed from modifying polynorbornene with olefin group with adding acrylic acid. The IR spectra was as following: C=C adsorption after ring opening was observed at 1535 cm$^{-1}$, and C—O—C adsorption was observed at 1099 cm$^{-1}$.

EXAMPLE 15

Preparation of Polynorbornene with Quaternary Ammonium Group from Norbornene Monomer with Epoxy Group The synthesis reaction was as following:

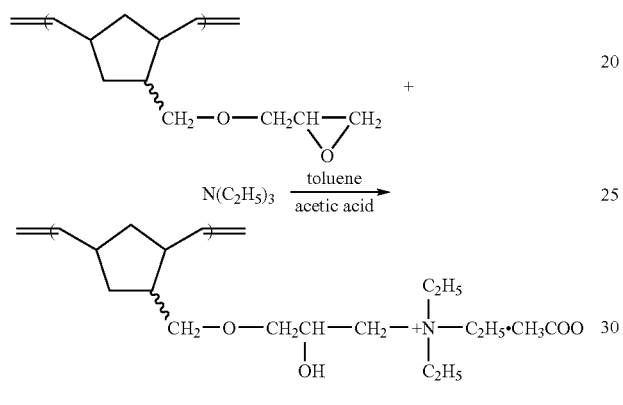

Poly(NBMEG) (1.81 g, 0.01 mol) was dissolved in 5 ml of xylene and heated by oil-bath at 80° C. Subsequently, 1.05 g (0.01 mol) of trimethyl ammonium (TEA) and 0.6 g (0.01 mol) of acetic acid was added at 80° C. with oil-bath for 4 hr. After completion of reaction, the solvent was removed to form a black sticky product which was then lyophilized. Yield: about 90%.

Polynorbornene with quartery amino group was formed by modifying polynorbornene with epoxy group [poly(NB-MEG)] with adding TEA. The IR spectra of this modified polymer was as following: C=C adsorption after ring opening was observed at 1530 cm$^{-1}$, and C—O—C adsorption was observed at 1095 cm$^{-1}$; and oxirane adsorption was observed at 901 cm$^{-1}$. On the other hand, the IR spectra of [poly(NBMEG)] was as following: C=C adsorption after ring opening was observed at 1591 cm$^{-1}$, and C—O—C adsorption was observed at 1097 cm$^{-1}$; and oxirane adsorption was observed at 903 cm$^{-1}$.

From the DSC results, $T_g$ of polynorbornene with water-soluble quartery ammonium was 17.6° C. As to the solubility, polynorbornene with water-soluble quartery ammonium was soluble in water, methanol but partial soluble in toluene, methylene chloride, trichloromethane, and tetrachloromethane, even at 60° C.; insoluble in acetone, THF and benzene.

NBMGE might further perform conventional epoxy polymerization process, such as photo-initiated cation ring-opening polymerization to prepare novel cross-linkable polymers [poly(EPNB)] which had cross-linkable norbornene side chain. They could further provide novel cross-linked hybrid polymers such as poly(CEPNB) via ROMP at room temperature. The structure of poly(CEPNB) was as following:

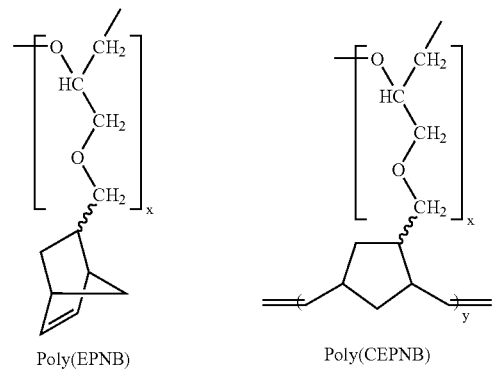

Poly(EPNB)            Poly(CEPNB)

The norbornene monomers with cross-linkable olefin group were prepared form acryl compound and cyclopentadiene via Diels-Alder reaction. The first product was norbornene methanol, and then an olefin group was introduced to form norbornene monomers with cross-linkable olefin group. Similarly, the present invention might also utilize Diels-Alder reaction to form a norbornene derivative containing —OH group, and an olefin group was then introduced to form norbornene compound with cross-linkable olefin group and its polymers as formula I and II.

The reaction is:

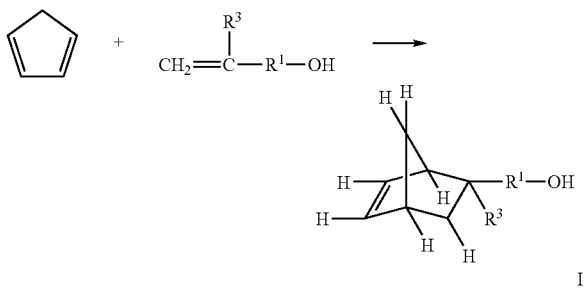

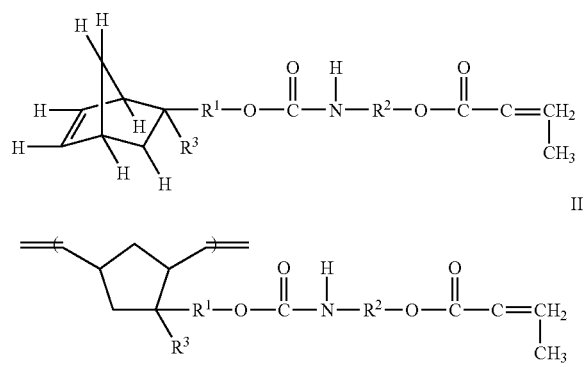

wherein $R^1$ was —(CH$_2$)m— or —C(O)O(CH$_2$)$_n$—, in which $1 \leq m$, $n \leq 4$, and m or n was an integer; $R^2$ was —(CH$_2$)p—, in which $1 \leq p \leq 4$ and p was an integer; and $R^3$ was H or CH$_3$.

The norbornene compound with cross-linkable olefin group and its polymers had excellent solubility.

The block co-polymer of carbazole and cross-linkable olefin groups of the present invention might be prepared according to example 13. This block co-polymer emitted fluorescence after UV or electro excitation and contained cross-linkable olefin groups. This polymer had high potential to apply in various fields.

On the other hand, the present invention also provided a process to polymerize norbornene monomers with cross-linkable olefin/epoxy group and other norbornene monomers to prepare functional block norbornene co-polymers, for example, transparent block norbornene co-polymers. What was noticeable was the block co-polymer of norbornene with phthalamide and cross-linkable olefin groups may be further hydrolyzed to give block co-polymer containing amino group (—NH$_2$) and cross-linkable olefin groups as formula III-4. The amino group (—NH$_2$) may be modified by conventional process. Most important, modified polymers still had cross-linkable olefin groups, and they had well-controlled molecular weight and narrow molecular distribution which facilitated the formation of self-assembly nanostructure.

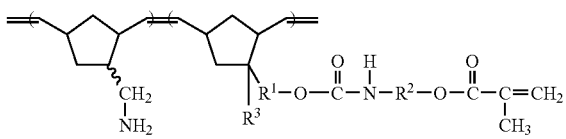

III-4 wherein R$^1$ was —(CH$_2$)m— or —C(O)O(CH$_2$)$_n$—, in which 1≦m, n≦4, and m or n was an integer; R$^2$ was —(CH$_2$)p—, in which 1≦p≦4 and p was an integer; and R$^3$ was H or CH$_3$. Preferably, m=1 and p=2, R was H, the structure of this block co-polymer was as formula III-4'.

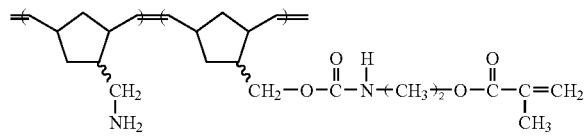

III-4'

Such block co-polymer had cross-linkable olefin group and modifiable amino group, and they had well-controlled molecular weight and narrow molecular distribution. Furthermore, R$^2$ was —(CH$_2$)$_2$—, which may destroied intermolecular hydrogen bond and perform excellent organic solvent solubility.

Similarly, norbornene with phthalamide and epoxy groups of the present invention prepared according to example 12 may be hydrated to form block co-polymer with cross-linkable olefin group and modifiable amino group as formula VII-2.

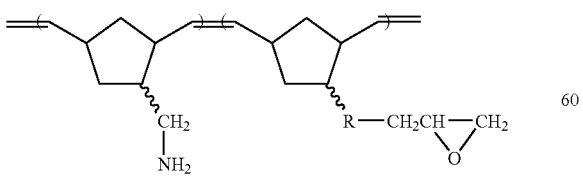

VII-2 wherein R was —O— or —(CH$_2$)$_n$—, 0≦n≦4 and n was an integer. Specifically, R was —O—; the structure was as VII-2'.

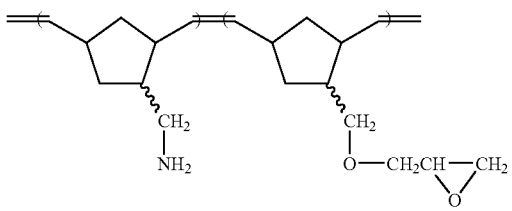

VII-2'

Therefore, the present invention provided a norbornene compound with cross-linkable olefin/epoxy groups. Norbornene polymers with cross-linkable side chain and their block copolymers as well as modified derivatives were prepared via living ring-open metathesis polymerization method. The resulting polymers with excellent solubility and optic properties had narrow molecular weight distribution, well-controlled molecular weight, small refraction ration and high transparency. They were also suitable for preparing hybrid materials with high thermal stability and chemical resistance.

In addition, the present invention provided a process to polymerize norbornene monomers with cross-linkable side chain/epoxy group and other norbornene monomers. The produced polymer contained cross-linkable olefin group and had excellent function of transparency or fluorescence. This polymer had high potential.

Although the present invention had been explained in relation to its preferred embodiment, it was to be understood that many other possible modifications and variations can be made without departing from the spirit and scope of the invention as hereinafter claimed.

What is claimed is:

1. A norbornene polymer with olefin side chain, comprising:

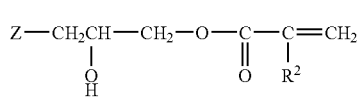

I a compound as formula I, wherein R$^1$ is —O— or —(CH$_2$)n—, in which 0≦n≦4, and n is an integer; Z is

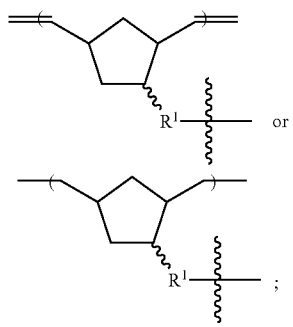

and R$^2$ is H or CH$_3$.

2. The polymer as claimed in claim 1, wherein the compound as formula I is

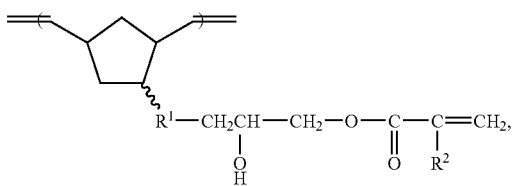
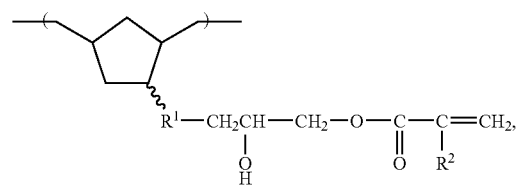
and $R^1$ is —O— or —$(CH_2)_n$—, in which $0 \leq n \leq 4$, and n is an integer; and $R_2$ is H or $CH_3$.
and $R^1$ is —$(CH_2)$—O— or —COO—$(CH_2)_j$—, in which $1 \leq j \leq 4$, and j is an integer; and $R^2$ is H or $CH_3$.
3. A norbornene polymer with olefin side chain, comprising:
* * * * *

UNITED STATES PATENT AND TRADEMARK OFFICE
CERTIFICATE OF CORRECTION

| | | |
|---|---|---|
| PATENT NO. | : 7,323,518 B2 | Page 1 of 1 |
| APPLICATION NO. | : 11/522483 | |
| DATED | : January 29, 2008 | |
| INVENTOR(S) | : Der-Jang Liaw | |

It is certified that error appears in the above-identified patent and that said Letters Patent is hereby corrected as shown below:

IN THE COVER PAGE:

Please list all inventors in section (75) as follows:

(75) Inventors: Der-Jang Liaw, Taipei (TW)

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,323,518 B2  Page 1 of 1
APPLICATION NO. : 11/522483
DATED : January 29, 2008
INVENTOR(S) : Der-Jang Liaw It is certified that error appears in the above-identified patent and that said Letters Patent is hereby corrected as shown below:

IN THE COVER PAGE:

Please list all inventors in section (75) as follows:

(75) Inventors: Der-Jang Liaw, Taipei (TW)
 Ching-Cheng Huang, Taipei (TW)
 Shov-Mau Hong, Taipei (TW)
 Ming-Hung Huang, Taipei (TW)

This certificate supersedes the Certificate of Correction issued January 5, 2010.

Signed and Sealed this

Third Day of August, 2010

David J. Kappos
*Director of the United States Patent and Trademark Office*